United States Patent
Zhang et al.

(10) Patent No.: US 8,838,848 B2
(45) Date of Patent: Sep. 16, 2014

(54) SYSTEMS AND METHODS FOR INTELLIGENT SYSTEM PROFILE UNIQUE DATA MANAGEMENT

(75) Inventors: Weijia Zhang, Austin, TX (US); Jianwen Yin, Round Rock, TX (US); Madhav Karri, Austin, TX (US); Vance E. Corn, Austin, TX (US); William C. Edwards, Round Rock, TX (US)

(73) Assignee: Dell Products LP, Round Rock, TX (US)

( * ) Notice: Subject to any disclaimer, the term of this patent is extended or adjusted under 35 U.S.C. 154(b) by 4 days.

(21) Appl. No.: 13/618,666

(22) Filed: Sep. 14, 2012

(65) Prior Publication Data

US 2014/0082236 A1    Mar. 20, 2014

(51) Int. Cl.
| | | |
|---|---|---|
| *G06F 13/28* | (2006.01) |
| *G06F 3/00* | (2006.01) |
| *G06F 5/00* | (2006.01) |
| *G06F 3/06* | (2006.01) |
| *G06F 13/10* | (2006.01) |

(52) U.S. Cl.
CPC .............. *G06F 13/10* (2013.01); *G06F 3/0601* (2013.01)
USPC .............................................. 710/25; 710/45

(58) Field of Classification Search
CPC .................... G06F 17/30067; G06F 17/30079; G06F 17/30091; G06F 17/30943
USPC ....................................................... 710/25, 45
See application file for complete search history.

(56) References Cited

U.S. PATENT DOCUMENTS

| | | | |
|---|---|---|---|
| 5,603,005 A | 2/1997 | Bauman et al. |
| 5,717,942 A | 2/1998 | Haupt et al. |
| 6,108,697 A | 8/2000 | Raymond et al. |
| 6,144,992 A | 11/2000 | Turpin et al. |
| 6,298,443 B1 | 10/2001 | Colligan et al. |
| 6,408,334 B1 | 6/2002 | Bassman et al. |
| 6,470,446 B1 | 10/2002 | Beelitz et al. |
| 6,519,679 B2 | 2/2003 | Devireddy et al. |
| 6,763,458 B1 | 7/2004 | Watanabe et al. |
| 6,854,122 B1 | 2/2005 | Sheriff et al. |
| 6,973,587 B1 | 12/2005 | Maity et al. |
| 7,028,138 B2 | 4/2006 | Ali et al. |
| 7,216,200 B2 | 5/2007 | Zhang et al. |
| 7,272,815 B1 | 9/2007 | Eldridge et al. |
| 7,360,211 B2 | 4/2008 | Hyden et al. |
| 7,426,052 B2 | 9/2008 | Cox et al. |
| 7,430,592 B2 | 9/2008 | Schmidt et al. |
| 7,526,541 B2 | 4/2009 | Roese et al. |

(Continued)

OTHER PUBLICATIONS

Phung et al., "Systems and Methods for Extension of Server Management Functions", U.S. Appl. No. 13/898,991, filed May 21, 2013, 25 pgs.

(Continued)

*Primary Examiner* — Farley Abad
(74) *Attorney, Agent, or Firm* — Egan, Peterman & Enders LLP.

(57) ABSTRACT

Systems and methods are provided that may be implemented to manage machine-specific System Profile Unique Data (SPUD) information for one or more information handling systems. Such SPUD information may be managed and transported through in-band and/or out-of-band processing and communications, and may be employed to make restoration of machine-specific data possible either through network data communications and/or local system data communications.

26 Claims, 6 Drawing Sheets

(56) References Cited

U.S. PATENT DOCUMENTS

| | | | |
|---|---|---|---|
| 7,610,575 B2 | 10/2009 | Sproule | |
| 7,706,369 B2 | 4/2010 | Roese et al. | |
| 7,739,372 B2 | 6/2010 | Roese et al. | |
| 7,739,402 B2 | 6/2010 | Roese et al. | |
| 7,765,371 B2 | 7/2010 | Abels et al. | |
| 7,805,533 B2 | 9/2010 | Burns et al. | |
| 7,877,614 B2 | 1/2011 | Frenkiel et al. | |
| 7,895,428 B2 | 2/2011 | Boland et al. | |
| 7,898,977 B2 | 3/2011 | Roese et al. | |
| 7,945,945 B2 | 5/2011 | Graham et al. | |
| 8,086,834 B2 | 12/2011 | Brisky et al. | |
| 8,086,838 B2 | 12/2011 | Harmer | |
| 8,099,624 B1* | 1/2012 | Saxena et al. | 714/5.11 |
| 8,191,107 B1 | 5/2012 | Frattura et al. | |
| 8,260,841 B1 | 9/2012 | Maity | |
| 8,510,422 B2 | 8/2013 | Phung et al. | |
| 2003/0216143 A1 | 11/2003 | Roese et al. | |
| 2004/0162857 A1 | 8/2004 | Butts | |
| 2005/0027837 A1 | 2/2005 | Roese et al. | |
| 2005/0055688 A1 | 3/2005 | Barajas et al. | |
| 2005/0066015 A1 | 3/2005 | Dandekar et al. | |
| 2005/0076245 A1 | 4/2005 | Graham et al. | |
| 2005/0172280 A1 | 8/2005 | Ziegler et al. | |
| 2005/0216664 A1 | 9/2005 | Taninaka et al. | |
| 2005/0237996 A1 | 10/2005 | Sakuraba et al. | |
| 2006/0018505 A1 | 1/2006 | Cherian et al. | |
| 2006/0031936 A1 | 2/2006 | Nelson et al. | |
| 2006/0036730 A1 | 2/2006 | Graham et al. | |
| 2006/0048142 A1 | 3/2006 | Roese et al. | |
| 2006/0075093 A1 | 4/2006 | Frattura et al. | |
| 2006/0190532 A1 | 8/2006 | Chadalavada | |
| 2006/0212143 A1 | 9/2006 | Nguyen et al. | |
| 2007/0124407 A1 | 5/2007 | Weber et al. | |
| 2007/0162695 A1 | 7/2007 | Ali et al. | |
| 2007/0168049 A1* | 7/2007 | Rao et al. | 700/11 |
| 2007/0168481 A1 | 7/2007 | Lambert et al. | |
| 2007/0204105 A1* | 8/2007 | Lauffer et al. | 711/114 |
| 2008/0002694 A1 | 1/2008 | Brahmaroutu et al. | |
| 2008/0033972 A1 | 2/2008 | Yin et al. | |
| 2008/0126551 A1 | 5/2008 | Conner et al. | |
| 2008/0155094 A1 | 6/2008 | Roese et al. | |
| 2008/0201501 A1 | 8/2008 | Partani et al. | |
| 2009/0037655 A1 | 2/2009 | Cherian et al. | |
| 2010/0057987 A1 | 3/2010 | Liu | |
| 2010/0268925 A1 | 10/2010 | Brisky et al. | |
| 2010/0306773 A1 | 12/2010 | Lee et al. | |
| 2011/0072280 A1 | 3/2011 | Chiasson et al. | |
| 2011/0078293 A1 | 3/2011 | Phung et al. | |
| 2011/0173427 A1 | 7/2011 | Merkin et al. | |
| 2011/0264951 A1* | 10/2011 | Pratt et al. | 714/6.32 |
| 2011/0289350 A1 | 11/2011 | Andrews et al. | |
| 2011/0296404 A1 | 12/2011 | Zhang et al. | |
| 2012/0110262 A1* | 5/2012 | Zhang et al. | 711/114 |
| 2012/0198245 A1 | 8/2012 | Mundt et al. | |
| 2012/0317633 A1 | 12/2012 | O'Donnell et al. | |

OTHER PUBLICATIONS

IBM, "Navigator for I", Printed From Internet May 26, 2009, 3 pgs.

IBM, "IBM iSeries Navigator System Management Plug-In for SAP", Printed From Internet May 26, 2009, 1 pg.

Business Wire; Business Services Industry, "F5 and Oracle Collaborate to Release Big-Ip Load Balancer System Management Plug-In for Oracle Enterprise Manager 10g Grid Control", Oct. 31, 2005, 10 pgs.

Highbeam Research, "Nimsoft Team Up With Oracle", Printed From Internet May 26, 2009, 4 pgs.

All Business, "Oracle Releases F5 Management Plug-In Via iControl", Printed From Internet May 26, 2009, 4 pgs.

Warren Togami, "Remote Conversion to Linux Software RAID-1 for Crazy Sysadmins HOWTO", 2004, 11 pgs.

"Remote Raid/Mirror", HTMlCenter, Printed From Internet Jul. 22, 2010, 2 pgs.

Power6 Information, "Installing an HA-two system RAID Configuration", Printed From Internet Jul. 22, 2010, 4 pgs.

Phung et al. "Systems and Methods for Extension of Server Management Functions", U.S. Appl. No. 12/587,001; Office Action, Jun. 15, 2012, 13 pgs.

Wikipedia, "License Manager" Printed from Internet Jun. 20, 2012, 2 pgs.

McNeill, "Virtual Machine Asynchronous Patch Management", U.S. Appl. No. 13/210,552, filed Aug. 16, 2011, 17 pgs.

Karandikar et al., "System and Method for Providing an Image to an Information Handling System", U.S. Appl. No. 13/174,221, filed Jun. 30, 2011, 35 pgs.

Phung et al. "Systems and Methods for Extension of Server Management Functions", U.S. Appl. No. 12/587,001; Amendment, Oct. 15, 2012, 16 pgs.

Zhang et al., "Systems and Methods for Remote Raid Configuration in an Embedded Environment", U.S. Appl. No. 12/925,673, filed Oct. 27, 2010, 31 pgs.

Andrews et al., "System and Method for Removable Network Attached Storage Enabling System Recovery From Backup", U.S. Appl. No. 13/187,219, filed Jul. 20, 2011, 30 pgs.

Zhang et al., "Systems and Methods for Out-Of-Band Backup and Restore of Hardware Profile Information", U.S. Appl. No. 13/365,901, filed Feb. 3, 2012, 37 pgs.

Phung et al., "Systems and Methods for Extension of Server Management Functions", U.S. Appl. No. 13/898,991, filed May 21, 2013, Preliminary Amendment, Jun. 27, 2013, 18 pgs.

* cited by examiner

SYSTEMS AND METHODS FOR INTELLIGENT SYSTEM PROFILE UNIQUE DATA MANAGEMENT

FIELD OF THE INVENTION

This invention relates generally to information handling systems and, more particularly, to system profile unique data management for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically provided with machine-specific information that is unique to each given information handling system. Examples of such machine-specific information includes Linux KickStart files, ini files, configuration files, and autorun files, batch files, etc. Specific examples of information handling systems include remote servers that are employed in a cloud computing environment to deliver computing resources (e.g., applications, data storage, processing) over the Internet to local information handling systems. In such a cloud computing environment, moving workload images from one server system to another server system has become a routine task. During movement of such information, machine specific information can hinder a system from operating properly if blindly cloned to other systems. In a heterogeneous environment having both virtual and physical operating characteristics, the conventional handling of such machine-specific information is mainly through agents running on the operating systems or virtual machines of individual information handling systems. In any case, in-band operating system (OS) involvement is required to remove machine-specific information from a given system and to reinstall machine-specific information to the same system when a new workload image is installed to the given system. This conventional practice typically leads to "agent-sprout", i.e., required steps of installing agent, running agent, updating agent, un-installing agent, etc.

SUMMARY OF THE INVENTION

Disclosed herein are systems and methods that may be implemented to manage (e.g., including transfer) machine-specific System Profile Unique Data (SPUD) information for one or more information handling systems. Using the disclosed systems and methods, SPUD information may be managed and transported through in-band and/or out-of-band processing and communications, and may be employed in one embodiment to make restoration of machine-specific data possible either through network data communications and/or local system data communications. In another embodiment, SPUD information may be comprehensive in content so as to allow all machine-specific information to be restored in one shot or operation.

In the practice of the disclosed systems and methods, machine-specific SPUD information includes information that is unique to a given information handling system and that is required by the given information handling system in order for the given system to properly operate to perform one or more assigned information handling tasks. In this regard, such machine-specific SPUD information for a given information handling system is different from SPUD information required by other information handling systems in order for these other systems to properly operate to perform one or more of their assigned tasks, including to perform the same or similar information handling tasks as performed by the given information handling system. Examples of machine-specific SPUD information includes, but is not limited to, unique system data such as system service tag information, static hostname, system MAC address/es, system storage map/s, system IP address/es, static IP address/es, storage configuration, hardware information including system-specific hardware configuration information, software license/s, user account and login information, information regarding BIOS type and BIOS setting/s, BIOS firmware, network interface card (NIC) firmware, etc.

In one embodiment, the disclosed systems and methods may be employed to deploy workload images to one or more information handling systems (e.g., servers) while at the same time preserving the unique SPUD for each individual information handling system. In one embodiment, such workload images may be further characterized as in-band workload images that include information or data configured for in-band processing by an information handling system. Using the disclosed systems and methods, workload images may be deployed in one embodiment in an out-of-band manner to a single information handling system or to a plurality of information handling systems (e.g., servers) while at the same time preserving the unique SPUD for each individual information handing system. In one embodiment, the SPUD information may be so managed without any in-band operating system (e.g., OS agent) involvement being required other than for operating system (OS) activation. In such an exemplary embodiment of the disclosed systems and methods, the entire spectrum (e.g., hardware layer and application images) may be deployed in an out-of-band manner. Moreover, in one exemplary embodiment out-of-band deployment of workload images may be performed in a heterogeneous environment having both virtual and physical operating system characteristics.

Thus, in one exemplary embodiment, the disclosed systems and methods may be implemented to provide a seamless solution to deploy images to a plurality of information handling systems with the capability of maintaining each system's particular SPUD. Such a capability may be employed to allow a workload image to be migrated from one information handling system to another target information handling system, while at the same time preserving the relationship between SPUD information components of the given target system, e.g., such as bonding between software licenses and individual service tag of a specific target system. In a further embodiment, this image deployment may be out-of-band and may cover the entire spectrum from hardware layer to the application.

In one respect, disclosed herein is an information handling system, including: at least one in-band processing device; at least one out-of-band processing device; and persistent storage coupled to the out-of-band processing device and to the in-band processing device. The out-of-band processing device may be configured to manage System Profile Unique Data (SPUD) stored on the persistent storage for the information handling system, the SPUD including machine-specific information that is unique to the information handling system.

In another respect, disclosed herein is a method of managing System Profile Unique Data (SPUD) for one or more in information handling systems. The method may include providing an information handling system that itself includes at least one in-band processing device, at least one out-of-band processing device, and persistent storage coupled to the out-of-band processing device and to the in-band processing device. The method may also include: using the out-of-band processing device to manage SPUD stored on the persistent storage for the information handling system, the SPUD including machine-specific information that is unique to the information handling system.

DESCRIPTION OF ILLUSTRATIVE EMBODIMENTS

Figure 1:
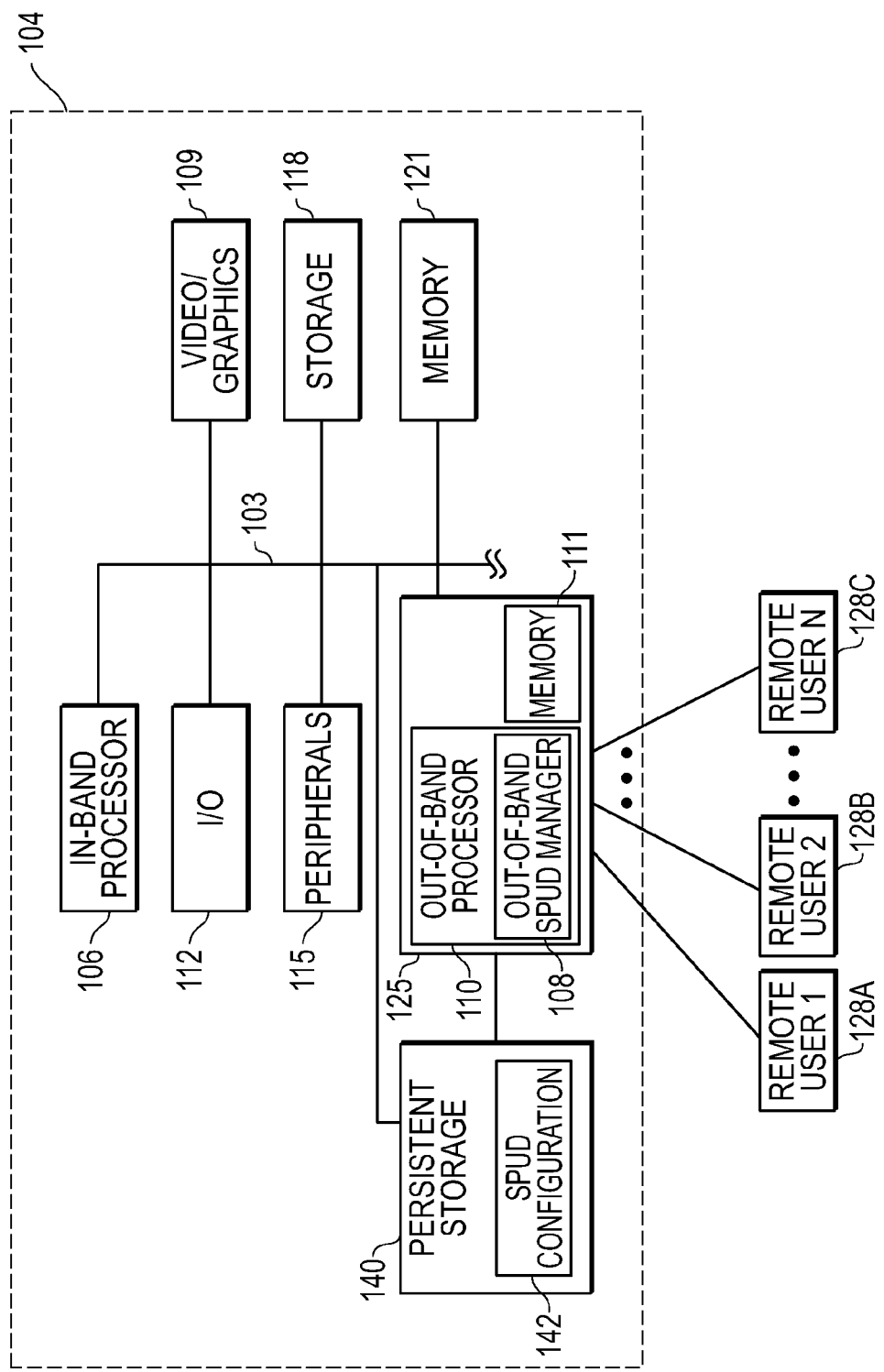
FIG. 1 is a simplified block diagram of an information handling system according to one exemplary embodiment of the disclosed systems and methods.

FIG. 1 is a block diagram of an information handling system 104 (e.g., such as a cloud computing server) as it may be configured according to one exemplary embodiment to perform SPUD management. As shown, system 104 may include one or more in-band processors 106, one or more buses or communication media 103, video/graphics hardware 109, storage 118, memory 121, input/output (I/O) 112, peripherals 115, and a remote access controller (RAC) 125 having one or more out-of-band processors 110 and memory 111. In this embodiment, out-of-band processor 110 is provided with an out-of-band SPUD manager module 108 that is configured to perform out-of-band spud management tasks in a manner as described further herein.

Still referring to FIG. 1, bus 103 provides a mechanism for the various components of system 104 to communicate and couple with one another. In-band processor 106 may include a Host processor (e.g., CPU) running a host operating system (OS) for system 104, and out-of-band processor 110 may be a service processor, embedded processor, etc. Video/graphics 109, storage 118, memory 121, I/O 112 and peripherals 115 may have the structure, and perform the functions known to those of skill in the art. Besides memory 121 (e.g., RAM), processor 106 may include cache memory for storage of frequently accessed data, and storage 118 may include extended memory for processor 106. It will be understood that the embodiment of FIG. 1 is exemplary only, and that an information handling system may be provided with one or more processing devices that may perform the functions of processor 106, processor 110, remote access controller 125, and other optional processing devices. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 1 is exemplary only, and that other information handling system architectures may be employed in the practice of the disclosed systems and methods that are suitable for performing the out-of-band SPUD management tasks described herein, e.g., system architectures those having one or more different components and/or fewer or greater number of system components.

The disclosed systems and methods may be implemented in one exemplary embodiment using a plug-in architecture framework to allow extension of SPUD management functionalities (e.g., using Dell unified server configuration ("USC") server management functionalities available from Dell Products L.P. of Round Rock, Tex.) in a unified extension firmware interface ("UEFI") environment by leveraging available remote access controller core or optional flash memory space. Further information on implementation of USC functionalities in a UEFI environment may be found, for example, in U.S. patent application Ser. No. 12/587,001 filed Sep. 30, 2009, and incorporated herein by reference in its entirety for all purposes. Among other things, the disclosed systems and methods may be implemented to provide a hardware and software interface to allow use of a plug-in framework in the embedded system management that may be run under the BIOS firmware and the UEFI environment. The disclosed systems and methods may also be implemented to provide a USC server management architecture that may be modified and enhanced over time, and/or that may also be employed to extend availability of the USC server management framework to remote users 128.

Still referring to FIG. 1, remote access controller 125 provides access to a plurality of remote users 128A-128C, although access may be provided to a single user 128 in other embodiments. In this regard, remote access controller 125 allows remote users to manage, administer, use, and/or access various resources of information handling system 104 (e.g., either native or virtual) from a remote location. However, remote or local access may be provided to information handling system 104 using any other configuration suitable for accomplishing the out-of-band SPUD management tasks as described further herein.

In the exemplary embodiment of FIG. 1, remote users 128A-128C may have in-band or out-of-band access to system 104 as desired. For example, remote users 128A-128C may have wired and/or wireless access through a local area network (LAN), wide area network (WAN), wireless local area network (WLAN), wireless wide area network (WWAN), dial-up modem, etc. In one embodiment, remote access controller (RAC) 125 may be an integrated Dell Remote Access Controller (iDRAC) available from Dell Products L.P. of Round Rock, Tex. Further information on such a remote access controller may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

As further shown, remote access controller 125 is coupled to remote access controller persistent storage 140 (e.g., non-volatile random access memory "NVRAM" such as embedded and partitioned flash memory, Electrically Erasable Programmable Read Only Memory—EEPROM, etc.), upon which one or more server management applications forming part of a USC framework may be stored in addition to one or more components or applications forming part of an embedded SPUD management configuration framework 142 and other functions, e.g., BIOS, unified extensible firmware interface ("UEFI") modules, etc. In the embodiment of FIG. 1, persistent storage 140 is managed by remote access controller 125 and may be utilized for out-of-band SPUD configuration management. In one exemplary embodiment, persistent storage 140 may be embedded in the system motherboard and may be, for example, about 1 GB in size.

Figure 2:
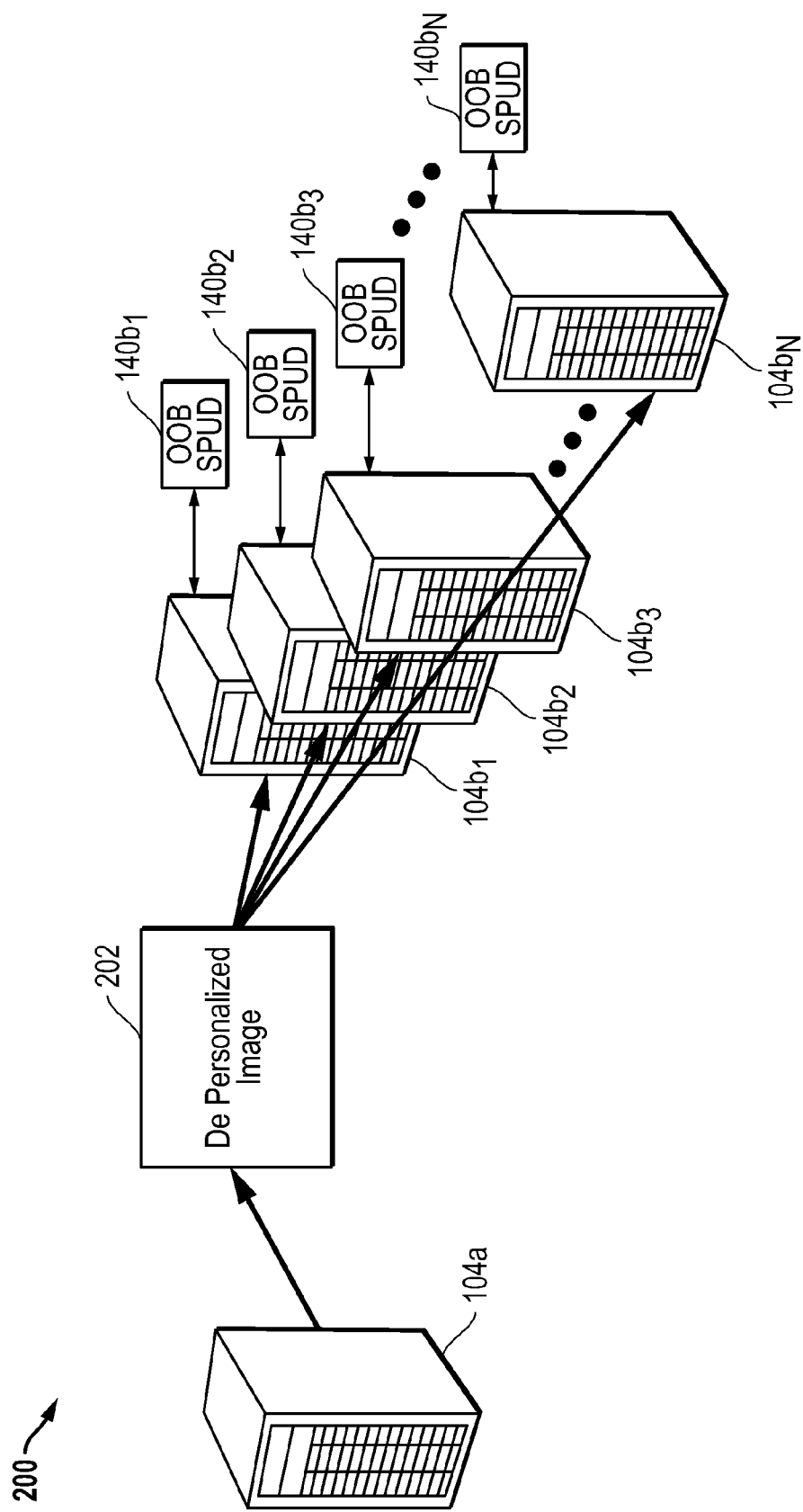
FIG. 2 illustrates deployment of a workload image from a designated source information handling system to a plurality of target information systems according to one exemplary embodiment of the disclosed systems and methods.

FIG. 2 illustrates one exemplary embodiment 200 for deployment of a depersonalized workload image 202 (e.g., a "gold image") from a designated source information handling system 104a to a plurality of target information handling systems $104b_1$ to $104b_N$. Such a workload image 202 may be deployed in this manner, for example, to re-image an existing target system 104b from which a previous workload image has been erased or otherwise removed or disabled, or to provide an initial image for a new target system 104b which has never had a workload image 202 previously installed. In this regard, the disclosed systems and methods may be implemented to accomplish full or partial (subset) configuration updates of existing systems 104, or may be alternatively be implemented to accomplish the initial deployment of workload images for a new set of target systems 104, e.g., such as initial imaging a plurality of blank information handling systems 104 during initial deployment of the systems 104 as a set of servers. Whatever the case, a workload image 202 may include system non-unique information and data such as application software, operating system software, virtual machine and/or hypervisor software, stored data and/or database information, etc. In one embodiment, a workload image 202 may be further characterized as being an in-band workload image that includes information or data configured for in-band processing by information handling system 104.

In the embodiment of FIG. 2, a deployment of image 202 may be accomplished using any communication link/s between source system 104a and the multiple target systems $104b_1$-$104b_N$, for example, using a network such as the Internet or corporate intranet or any other suitable inter-system data communication link. It will be understood that although FIG. 2 illustrates deployment of a workload image 202 from a single source system 104a, a workload image 202 maybe similarly deployed from one or more source systems 104a to a single target system 104b or to two or more target systems 104b. In the embodiment of FIG. 2, each of source system 104a and each of target systems $104b_1$-$104b_N$ may be configured, for example, with components according to the exemplary embodiment of FIG. 1, e.g., such that any given information handling system 104 is capable of serving the role as a source system 104a or target system 104b.

Still referring to FIG. 2, each given one of target systems $104b_1$-$104b_N$ is shown including a respective out-of-band (OOB) persistent storage $140b_1$-$140b_N$ on which SPUD information corresponding to the given target system 104b may be stored during re-imaging or initial imaging of the given target system 104b. Such SPUD may include information that is unique to each given target information handling system 104b, e.g., such as unique system data such as system service tag information, static hostname, system MAC address/es, system storage map/s, system IP address/es, static IP address/es, storage configuration, hardware information including system-specific hardware configuration information, software license/s, user account and login information, information regarding BIOS type and BIOS setting/s, BIOS firmware, network interface card (NIC) firmware, etc. Where a target system 104b is being re-imaged with workload image 202, such SPUD may be transferred from in-band components (e.g., storage 118) to corresponding OOB persistent storage 140b of each target system 104b prior to removing or disabling any pre-existing workload image that may exist on the corresponding target system 104b (e.g., on storage 118). For new (non-imaged) target systems 104b, SPUD may be imported into OOB persistent storage 140 of a given target system 104b from another information handling system 104, e.g., across a network or other suitable communication link. Further, in one exemplary embodiment SPUD stored on persistent storage 140 may be edited (e.g., for purposes of customization and identifications) by local or remote input via provided user interfaces.

Figure 3:
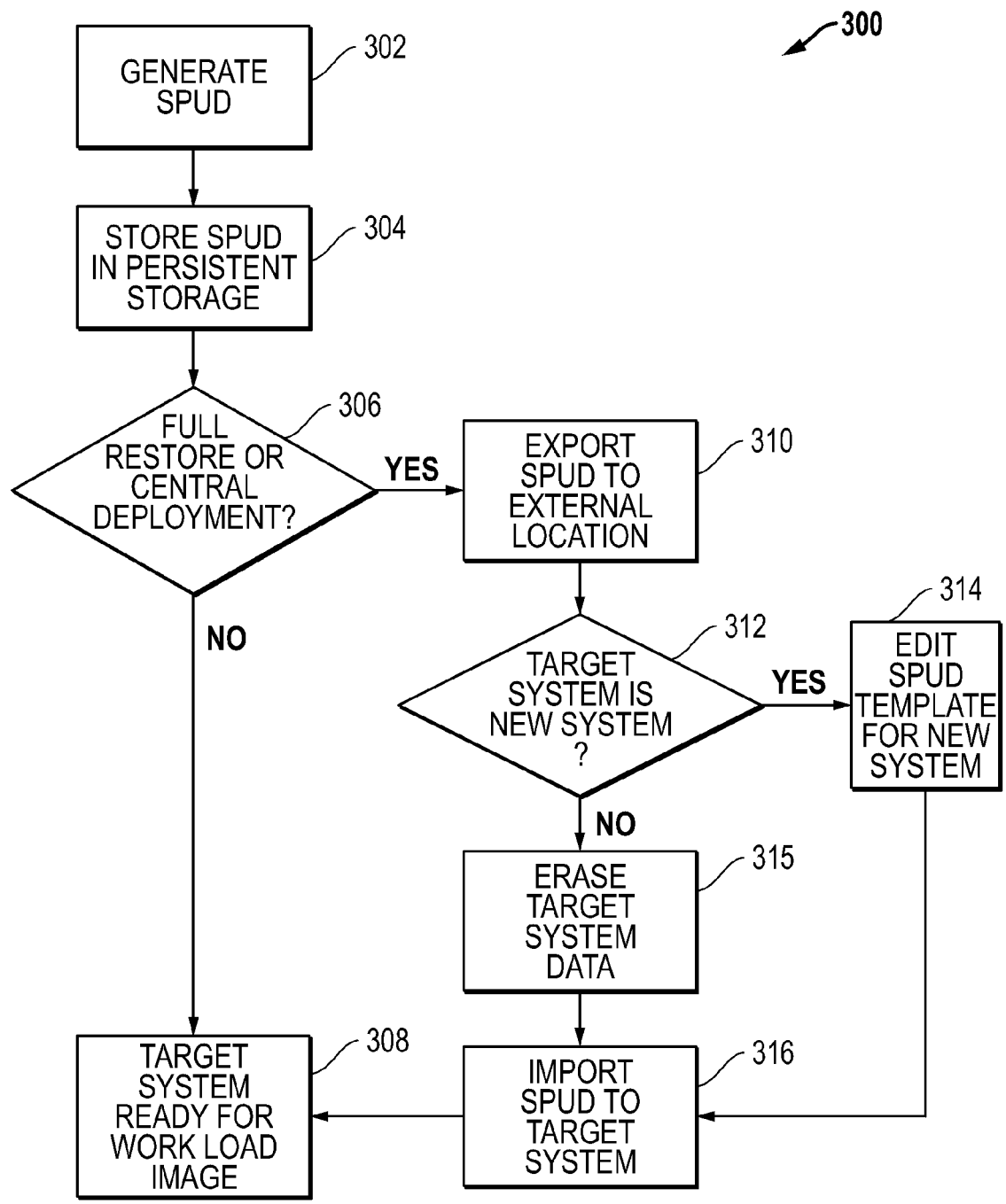
FIG. 3 illustrates methodology according to one exemplary embodiment of the disclosed systems and methods.
Figure 4:
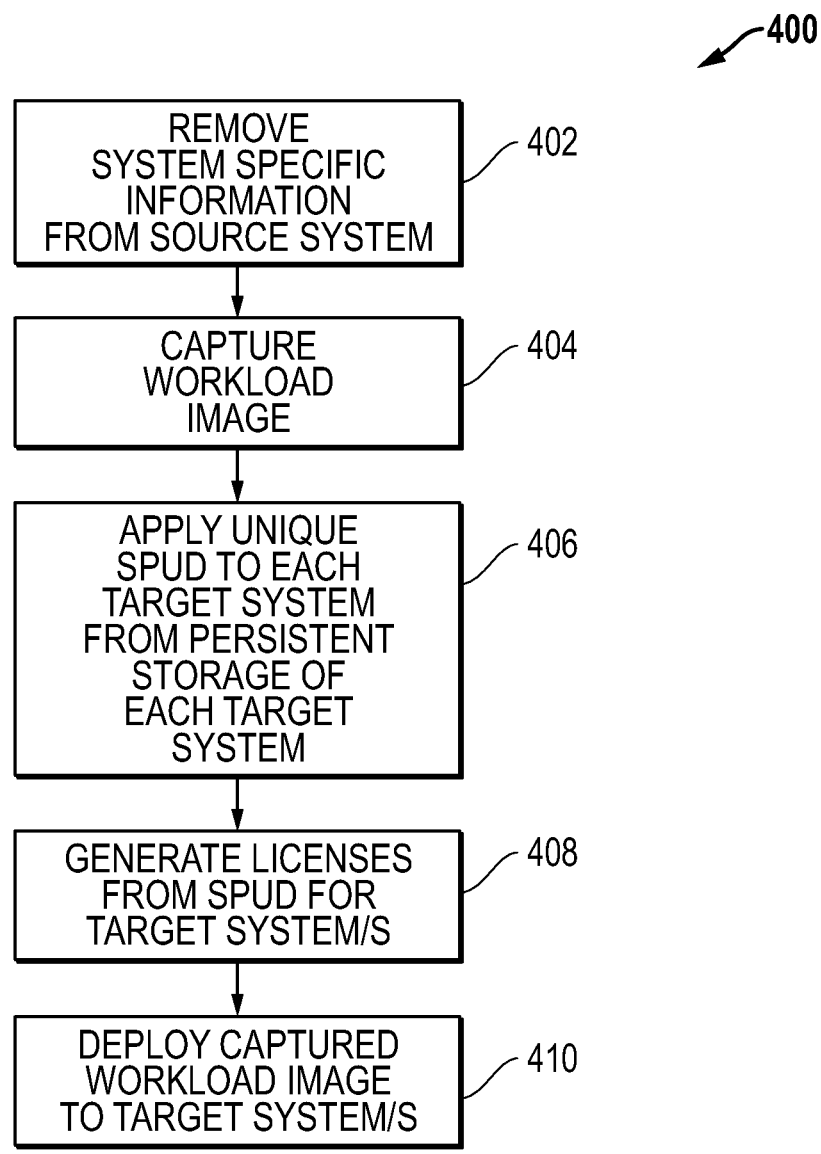
FIG. 4 illustrates methodology according to one exemplary embodiment of the disclosed systems and methods.

FIGS. 3 and 4 illustrate methodology that may be employed in one exemplary embodiment for generating SPUD and deploying a new workload image 202 from a source system 104a and the generated SPUD to one or more target systems 104b. In this regard, the system image (e.g., including system software and firmware) of each given system 104 may be separated into machine-generic workload image content (e.g., such as operating systems, applications, firmware, drivers, etc.) and machine-specific SPUD content (e.g., such as licenses, system-specific configurations, etc.) as appropriate depending on whether the given system is a source system 104a or target system 104b. In this regard, a system inventory of software may be collected using any suitable technique for gathering an inventory of system software and firmware, e.g., at system restart using Collect System Inventory On Restart (CSIOR) utility available from Dell Products L.P. of Round Rock, Tex. Such an inventory may include all software and firmware stored on system storage, e.g., system storage 118, persistent storage 140, etc. Collected SPUD may be selected from the collected system image information (e.g., including a set of licenses and configurations) and packaged into a SPUD format that is stored in persistent storage 140 for each target system 104b. A workload image (e.g., machine generic image selected from the collected system image information of a source system 104a) may then be deployed to each of the target system/s 104b. Each target system 104b may then use its unique identifier (e.g., such as service tag identifier) to fetch its respective SPUD from persistent storage 140. The information in the fetched SPUD may then be used to auto generate a license set for the corresponding target system 104b. In this way, the hardware of each target system 104b may be setup with a new workload image together with a snapshot of the workflow and particularized SPUD configurations and licenses for the given target system 104b. In one embodiment, all steps of FIG. 3 and some steps of FIG. 4 may be performed by on one or more target system/s 104b in an out-of-band manner using out-of-band SPUD manager 108 executing on out-of-band processing device 110, i.e., separately from and without requiring interaction with, or operation of, in-band processing device/s 106 and the associated operating system of system 104.

Specifically referring to FIG. 3, SPUD is first generated in step 302 of methodology 300 for a target system 104b and then stored in step 304 to a persistent location of target system 104b such as persistent storage 140 of FIG. 1. In this regard, SPUD may be generated and stored in any suitable manner, including in a completely out-of-band manner using out-of-band processing device 110 without the in-band operating system executing on in-band processing device 106. Alternatively, SPUD may be additionally or alternatively generated using an operating system (OS) agent while system 104b is fully booted up and running, for example, if particular OS-related SPUD such as OS license information is required to be collected in an in-band manner.

In one exemplary embodiment, SPUD may be generated for a system 104b having pre-existing SPUD stored thereon together with workload image information that is to be replaced. For example, the existing SPUD may be fetched and stored using an automatic out-of-band module that collects the SPUD in step 302 and saves the collected SPUD to persistent storage 140 in step 304 during system boot-up. Alternatively, SPUD may be additionally or alternatively collected and saved in steps 302 and 304 in a similar manner using an operating system (OS) agent while system 104b is fully booted up and running, e.g., if particular OS-related SPUD such as OS license information is required to be collected. In one exemplary embodiment, pre-existing SPUD may be fetched and saved using an out-of-band utility such as out-of-band SPUD manager 108 executing on out-of-band processor 110 in conjunction with firmware and data storage of SPUD management configuration framework 142. In one embodiment, out-of-band SPUD manager 108 may identify and fetch SPUD for system 104b in step 302 from data locations such as network storage and local media. It will also be understood that SPUD may be generated from scratch in step 302 and entered by a user into persistent storage 140 in step 304 via out-of-band SPUD manager 108 in cases where system 104b is new or otherwise blank and has no pre-existing SPUD stored thereon.

Still referring to FIG. 3, methodology 300 proceeds according to step 306 depending on whether a full restore of system 104b is to be performed, or whether a central deployment of SPUD data from system 104b to other information handling systems is to be pursued. If no full restore or central deployment is to be performed, then methodology 300 proceeds to step 308 where the target system 104b is ready to receive the workload image 202 from a source system 104a, e.g., as described and illustrated with regard to FIG. 2. However if a full restore or central deployment is to be performed, then methodology 300 proceeds to step 310 where collected SPUD is exported to an external location such as removable storage, e.g., across a network such as Internet or corporate intranet, or other suitable data communications media. In the case of a full system restore of the system 104b, all storage of the target system 104b may be reformatted (wiped of data) after step 310.

If the final destination for the SPUD is a new target system 104b that is different from the system from which the SPUD was originally generated in step 302 (e.g., the system 104b has no existing machine-specific SPUD and/or other image loaded thereon), then a SPUD template may be edited in step 314 with the exported SPUD of step 310 by the appropriate user interfaces for the new target system. Such a SPUD template may be a configuration file and database schema in appropriate SPUD format with or without specific system data. Thereafter, the edited SPUD may be imported to persistent storage 140 of the target system 104b in step 316. If the final destination for the SPUD is not a new target system 104b (i.e., the target system 104b is the same system from which the SPUD was generated), then methodology 300 may proceed as shown from step 312 to step 315 where the data (including SPUD) is erased or removed from the target system 104b, and then to step 316 where the SPUD is imported back to persistent storage 140 of the target system 104b. In step 315, storage of target system 104b may be reformatted or all data otherwise removed from system storage 118 of the target system 104b, and optionally further removed from persistent storage 140 in case of full restore of system 104b. After step 316, the target system 104b is ready to receive the workload image 202. Although exported SPUD may be edited while stored on an external location as described above, it will be understood that in another exemplary embodiment SPUD stored on local persistent storage of the target system 104b may also be edited if desired or needed.

FIG. 4 illustrates one embodiment of a methodology 400 for generating and deploying a new workload image 202 from a source system 104a to a target system 104b. Methodology 400 starts in step 402 where any system specific information (e.g., SPUD such as such as service tag, MAC address, IP address, user accounts, etc.) is removed from the source system 104a. Next, in step 404, a workload image (e.g., "gold image") is captured from the source machine 104a, e.g., by using out-of-band SPUD manager 108 that executes in an out-of-band manner on out-of-band processing device 110. In one exemplary embodiment out-of-band SPUD manager 108 may be configured with the generic capability for both roles of capturing images on a source system/s 104a and for deploying images on target system/s 104b. However, it will be understood that in other embodiments, source system-specific and target system-specific out-of-band SPUD managers are also possible, such that a source system out-of-band SPUD manager is provided on the source machine that is only capable of capturing images and/or such that a target system out-of-band SPUD manager is provided on a target machine that is only capable of deploying images.

Next, the given SPUD corresponding to each target system 104b is retrieved by out-of-band SPUD manager 108 from persistent storage 140 of the respective target system 104b and applied (i.e., extracted and installed) by out-of-band storage manager 108 in step 406 to appropriate storage locations, e.g., on system storage 118. Then, in step 408 any appropriate licenses may be generated (i.e., bound to the specific system 104b) from the installed and extracted SPUD now present on each given target system 104b. Thereafter, the workload image is deployed in step 410 from the source system 104a to the target system/s 104b.

In the embodiment of FIG. 4, steps 406 to 410 may be performed on target system/s 104b in an out-of-band manner, i.e., without requiring interaction with, or operation of, in-band processing device/s 106. However, where certain licenses are present that require operating system participation to regenerate the licenses (i.e., to bind the licenses to the given system 104b), an in-band processing device 106 on the given target system 104b may be employed to execute the operating system to perform in-band generation and activation of the appropriate licenses and/or to otherwise join the operating system and SPUD data on the target system 104b. Such in-band license generation and/or in-band license activation on target system 104b may be performed in one embodiment the next time that the operating system is booted, e.g., from a "seed" or other data indicator and information installed on system storage 118 by out-of-band processing device 110 during step 406.

It will be understood that methodology 300 of FIG. 3 and methodology 400 of FIG. 4 are each exemplary only and that fewer, additional, or alternative steps may be alternatively implemented in other embodiments. For example, it is possible that a "gold image" or other workload image 202 may be first imported to a target system 104b, and then afterwards the SPUD applied to the system 104b, e.g., from persistent storage 140. However, in an alternative embodiment SPUD may be first applied (e.g., from persistent storage 140 to a designated location) to target system 104b, and afterwards a "gold image" or other workload image 202 deployed to the target system 104b. In such a case, when the workload image 202 is loaded and next executed, it will automatically recognize the SPUD, e.g., an autoscript may operate to merge the workload image 202 (including in-band operating system) with the appropriate recognized SPUD.

Figure 5:
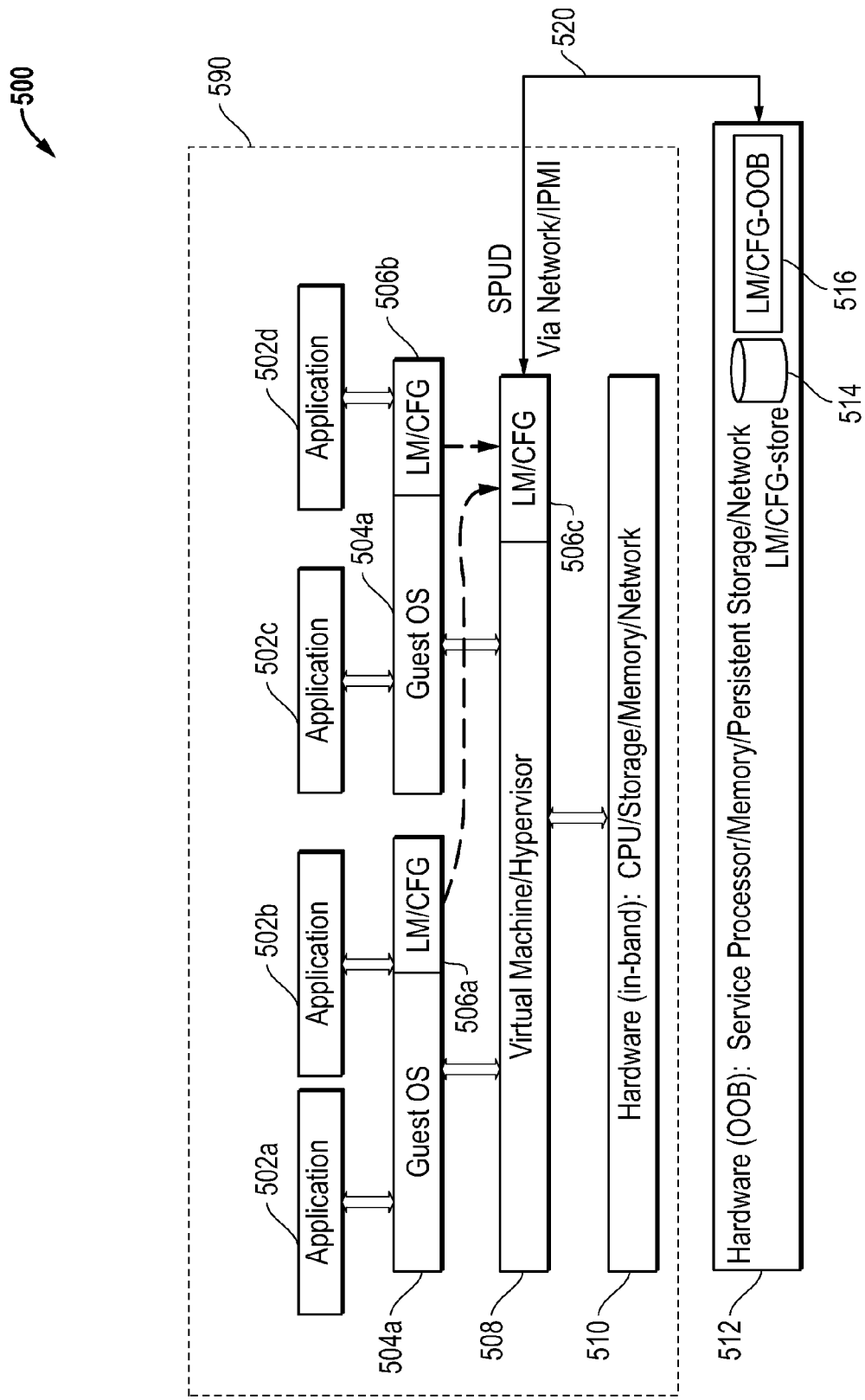
FIG. 5 illustrates cross-band license management as it may be implemented for a target information handling system according to one exemplary embodiment of the disclosed systems and methods.

FIG. 5 illustrates one exemplary embodiment 500 for cross-band license management as it may be implemented for a given target information handling system 104b using the disclosed systems and methods. As shown in FIG. 5, information handling system includes combined SPUD and workload information 590 that is contained in in-band software and hardware layers of a given target system 104. Examples of such information includes applications 502a-502b of an application layer, guest operating systems 504a and 504b of an operating system layer, virtual machine/hypervisor 508 of a virtual machine layer, and in-band hardware 510 (e.g., CPU 106, storage 118, memory 121, and network information) of a hardware layer. Also illustrated in FIG. 5 is out-of-band (OOB) hardware layer 512 that includes out-of-band processor 110, persistent storage 140, memory 111, and network information.

FIG. 5 also illustrates in-band license manager and configuration (LM/CFG) utilities 506a, 506b and 506c that are resident on respective operating system and virtual machine layers of system 104 as shown. LM/CFG utilities communicate from virtual machine layer 508 across IPMI network 520 as shown with out-of-band LM/CFG manager 516 (e.g., out-of-band SPUD manager module 108) on out-of-band processor 110 of system 104b, and with LM/CFG storage 514 (e.g., of embedded SPUD management configuration framework 142) that may be maintained on persistent storage 140 of system 104b. In this regard, out-of-band LM/CFG manager 516 may be configured to perform out-of-band license management with a persistent process and persistent store.

In one exemplary embodiment, each of LM/CFG utilities 506 may operate in an in-band manner to create SPUD information (e.g., licenses, service tag, MAC addresses, storage maps, IP addresses, user account and login information, etc.) for system 104b, e.g., such as in step 302 of FIG. 3. In-band LM/CFG utilities 506 may also retrieve, import, export, validate, and re-generate licenses by interacting with out-of-band LM/CFG manager 516 across IPMI network 520. Examples of tasks include, but are not limited to, steps of FIGS. 3 and 4 described herein. In one embodiment, once SPUD is generated and stored on persistent storage 140 by LM/CFG utilities 506 and out-of-band LM/CFG manager 516, then the pre-existing combined SPUD and workload information 590 of a given target system 104b may be removed (wiped) from the system 104b. When a new workload image (e.g., gold image) is deployed on the given target system 104b, LM/CFG utilities 506 and out-of-band LM/CFG manager 516 may also be employed to apply stored SPUD to the given target system 104b, e.g., in the manner described in steps 406 and 410 of FIG. 4. Re-generation of licenses from the SPUD may be performed by LM/CFG utilities 506 and out-of-band LM/CFG manager 516, e.g., as described in step 408 of FIG. 4.

Figure 6:
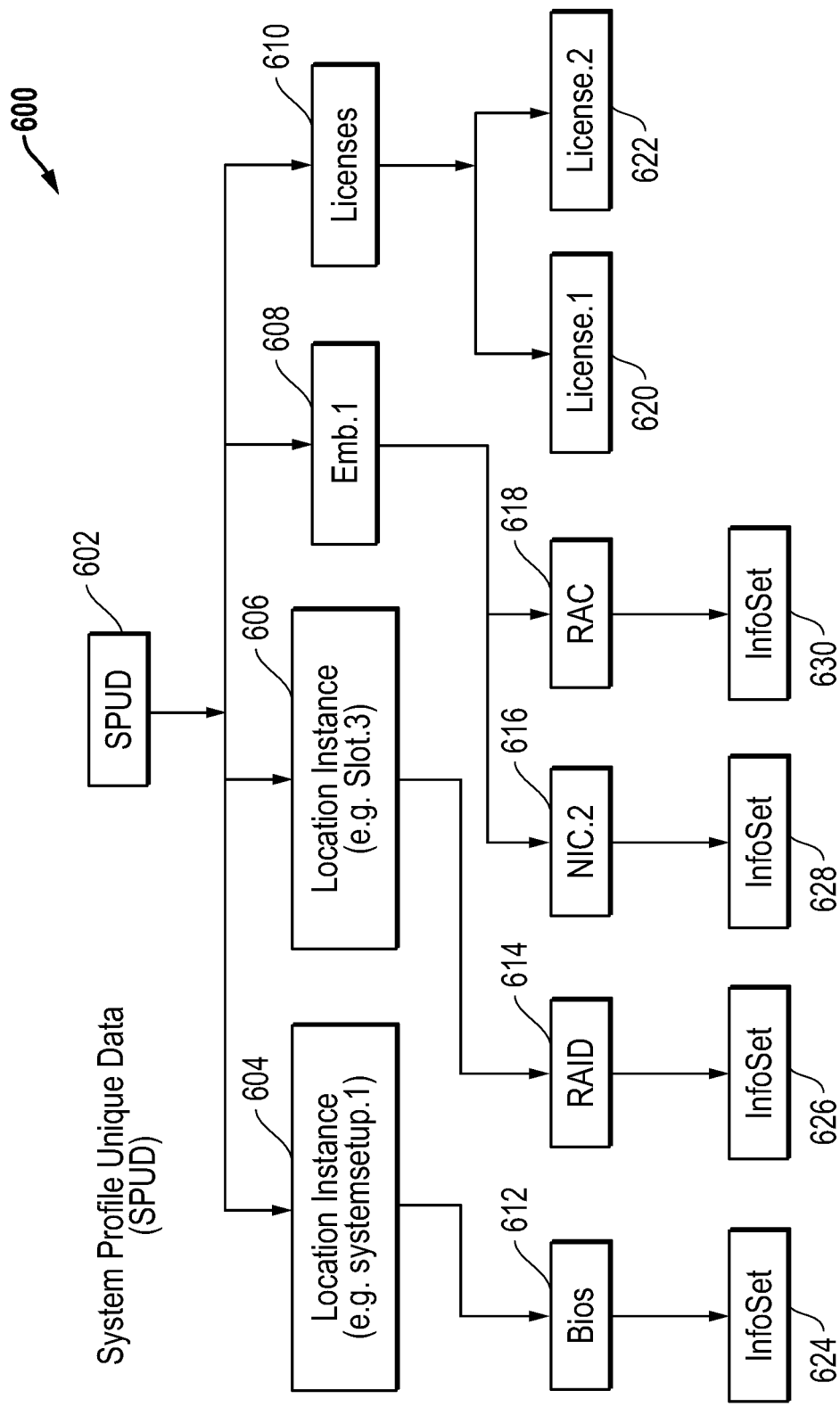
FIG. 6 illustrates possible types of SPUD information according to one exemplary embodiment of the disclosed systems and methods.

FIG. 6 illustrates one exemplary embodiment 600 showing possible types of SPUD information 602 (e.g., licenses and configuration information) that may be present, for example, on an information handling system 104. As shown, SPUD 602 may include the indicated location instances 604 and 606, as well as Emb.1 608 and licenses 610. Emb.1 608 may include NIC.2 616 with InfoSet 628 (e.g., NIC firmware, drivers, network, IP and MAC addresses, etc.), and remote access controller (RAC) 618 with InfoSet 630 (e.g., version, generation, type, licenses, etc.). Licenses 610 may include system specific multiple license instances 620 and 622 as shown. Location instance 604 may include Bios 612 and InfoSet 624. Location instance 606 may include redundant array of independent disks (RAID) 614 and InfoSet 626 (type of RAID controller, RAID controller password, disk identification, supported RAID levels such as RAID 1, RAID 2, etc.).

It will be understood that the configuration of the particular embodiments illustrated in FIGS. 1 and 2, and in FIGS. 5 and 6 is also exemplary, and that other configurations are possible.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   at least one in-band processing device;
   at least one out-of-band processing device; and
   persistent storage coupled to the out-of-band processing device and to the in-band processing device;
   where the out-of-band processing device is configured to manage System Profile Unique Data (SPUD) stored on the persistent storage for the information handling system, the SPUD including machine-specific information that is unique to the information handling system; and
where the information handling system further comprises system storage separate from the persistent storage, the system storage maintaining SPUD for the in-band processing device; where the in-band processing device is configured to access the system storage to support in-band system operations; and
where the out-of-band processing device is configured to: identify and gather SPUD from the system storage in an out-of-band manner while the in-band processing device is not operating, to save the gathered SPUD on the persistent storage while the in-band processing device is not operating, and to then re-install the saved SPUD from the persistent storage to the system storage while the in-band processing device is not operating.

2. The information handling system of claim 1, further comprising a remote access controller that includes the out-of-band processing device; and at least one external input/output (I/O) interface coupled to the remote access controller and out-of-band processing device, the external I/O interface being configured for wired or wireless coupling to one or more devices that are external to the information handling system; and where the remote access controller is configured to at least one of retrieve stored SPUD from the persistent storage and provide the retrieved SPUD across the external I/O interface to one or more external devices, receive SPUD from one or more external devices across the external I/O and store the received SPUD on the persistent storage; or a combination thereof.

3. The information handling system of claim 2, further comprising a system motherboard; and wherein the remote access controller and the persistent storage are embedded components on the motherboard of the information handling system.

4. The information handling system of claim 1, where the SPUD comprises machine-specific information unique to the information handling system that includes at least one of system service tag information, static hostname, system MAC address/es, system storage map/s, system IP address/es, static IP address/es, storage configuration, system-specific hardware configuration information, software license/s, user account and login information, information regarding BIOS type and BIOS setting/s, BIOS firmware, network interface card (NIC) firmware, or a combination thereof.

5. The information handling system of claim 1, further comprising at least one external input/output (I/O) interface coupled to the out-of-band processing device; and where the out-of-band processing device is configured to receive SPUD across the external I/O interface from an external user or external device, and to save the received SPUD on the persistent storage.

6. The information handling system of claim 1, where the system storage is configured to maintain SPUD for the in-band processing device; where the in-band processing device is configured to access the system storage to support in-band system operations; and where the out-of-band processing device is configured to retrieve stored SPUD from the persistent storage, and to install the retrieved SPUD on the system storage.

7. The information handling system of claim 1, where the at least one in-band processing device is configured to execute a host operating system (OS) for the information handling system; and where the at least one out-of-band processing device is separate from the in-band processing device.

8. The information handling system of claim 1, where the information handling system is a server that includes each of the in-band processing device, out-of-band processing device, system storage and persistent storage.

9. An information handling system, comprising:
at least one in-band processing device;
at least one out-of-band processing device; and
persistent storage coupled to the out-of-band processing device and to the in-band processing device;
system storage separate from the persistent storage;
where the out-of-band processing device is configured to manage System Profile Unique Data (SPUD) stored on the persistent storage for the information handling system, the SPUD including machine-specific information that is unique to the information handling system;
where at least one of:
the out-of-band processing device is configured to receive SPUD from another separate information handling system and store the received SPUD on the persistent storage, and the out-of-band processing device is further configured to install the stored received SPUD from the persistent storage to the system storage; or
at least one of the in-band processing device or the out-of-band processing device is configured to gather SPUD from the system storage and to save the gathered SPUD on the persistent storage, and the out-of-band processing device is further configured to then re-install the saved SPUD from the persistent storage to the system storage; and
where the system storage is configured to maintain SPUD for the in-band processing device; where the in-band processing device is configured to access the system storage to support in-band system operations; and where the out-of-band processing device is configured to: identify and gather SPUD from the system storage in an out-of-band manner while the in-band processing device is not operating, to save the gathered SPUD on the persistent storage while the in-band processing device is not operating, and to then re-install the saved SPUD from the persistent storage to the system storage while the in-band processing device is not operating.

10. An information handling system, comprising:
at least one in-band processing device;
at least one out-of-band processing device; and
persistent storage coupled to the out-of-band processing device and to the in-band processing device;
system storage separate from the persistent storage;
where the out-of-band processing device is configured to manage System Profile Unique Data (SPUD) stored on the persistent storage for the information handling system, the SPUD including machine-specific information that is unique to the information handling system;
where at least one of:
the out-of-band processing device is configured to receive SPUD from another separate information handling system and store the received SPUD on the persistent storage, and the out-of-band processing device is further configured to install the stored received SPUD from the persistent storage to the system storage; or
at least one of the in-band processing device or the out-of-band processing device is configured to gather SPUD from the system storage and to save the gathered SPUD on the persistent storage, and the out-ofband processing device is further configured to then re-install the saved SPUD from the persistent storage to the system storage; and where the system storage is configured to maintain SPUD for the in-band processing device; where the in-band processing device is configured to access the system storage to support in-band system operations; where the in-band processing device is configured to execute an in-band operating system (OS) agent thereon to gather SPUD from the system storage while the in-band processing device is operating, and to save the gathered SPUD on the persistent storage; and where the out-of-band processing device is configured to then re-install the saved SPUD from the persistent storage to the system storage while the in-band processing device is not operating.

11. An information handling system, comprising:
at least one in-band processing device;
at least one out-of-band processing device; and
persistent storage coupled to the out-of-band processing device and to the in-band processing device;
where the out-of-band processing device is configured to manage System Profile Unique Data (SPUD) stored on the persistent storage for the information handling system, the SPUD including machine-specific information that is unique to the information handling system; and
where the information handling system further comprises system storage separate from the persistent storage, the system storage maintaining SPUD for the in-band processing device; and
where the in-band processing device is configured to:
  execute one or more guest operating systems and a virtual machine layer,
  access the system storage to support the guest operating systems and virtual machine operations, and
  implement an in-band license manager and configuration (LM/CFG) utility on each of the guest operating systems and virtual machine layer to create the SPUD information;
where the out-of-band processing device is coupled to communicate with the virtual machine layer, the out-of band processing device being further configured to implement an out-of-band LM/CFG manager to manage SPUD stored on the persistent storage for the information handling system; and
where the in-band LM/CFG utilities implemented on each of the guest operating systems and virtual machine layer are further configured to create SPUD information for the system; and to interact with the out-of-band LM/CFG manager to retrieve, import, export, validate, and re-generate licenses from the SPUD by interacting with out-of-band LM/CFG manager.

12. An information handling system, comprising:
at least one in-band processing device;
at least one out-of-band processing device; and
persistent storage coupled to the out-of-band processing device and to the in-band processing device;
system storage separate from the persistent storage;
where the out-of-band processing device is configured to manage System Profile Unique Data (SPUD) stored on the persistent storage for the information handling system, the SPUD including machine-specific information that is unique to the information handling system;
where at least one of:
  the out-of-band processing device is configured to receive SPUD from another separate information handling system and store the received SPUD on the persistent storage, and the out-of-band processing device is further configured to install the stored received SPUD from the persistent storage to the system storage; or
  at least one of the in-band processing device or the out-of-band processing device is configured to gather SPUD from the system storage and to save the gathered SPUD on the persistent storage, and the out-of-band processing device is further configured to then re-install the saved SPUD from the persistent storage to the system storage; and
where the system storage is configured to maintain SPUD and workload data for the in-band processing device that is configured for in-band processing by the in-band processing device; where the in-band processing device is configured to access the system storage to support in-band system operations; and where the out-of-band processing device is configured to:
  identify and collect workload image data from the system storage, the workload image data being separate data from the system SPUD, and
  save the gathered workload image data on the persistent storage.

13. A method of managing System Profile Unique Data (SPUD) for one or more in information handling systems, comprising:
providing an information handling system, comprising:
  at least one in-band processing device,
  at least one out-of-band processing device, and
  persistent storage coupled to the out-of-band processing device and to the in-band processing device; and
using the out-of-band processing device to manage SPUD stored on the persistent storage for the information handling system, the SPUD including machine-specific information that is unique to the information handling system;
where the provided information handling system further comprises system storage separate from the persistent storage, the system storage maintaining SPUD for the in-band processing device; and
where the method further comprises using the out-of-band processing device to identify and gather SPUD from the system storage in an out-of-band manner while the in-band processing device is not operating, then to save the gathered SPUD on the persistent storage while the in-band processing device is not operating, and to then re-install the saved SPUD from the persistent storage to the system storage while the in-band processing device is not operating.

14. The method of claim 13, where the provided information handling system further comprises at least one external input/output (I/O) interface coupled to the out-of-band processing device; and where the method further comprises retrieving stored SPUD from the persistent storage and providing the retrieved SPUD across the external I/O interface to one or more external devices, receiving SPUD from one or more external devices across the external I/O and storing the received SPUD on the persistent storage; or a combination thereof.

15. The method of claim 13, where the SPUD comprises machine-specific information unique to the information handling system that includes at least one of system service tag information, static hostname, system MAC address/es, system storage map/s, system IP address/es, static IP address/es, storage configuration, system-specific hardware configuration information, software license/s, user account and login information, information regarding BIOS type and BIOS setting/s, BIOS firmware, network interface card (NIC) firmware, or a combination thereof.

16. The method of claim 13, the system storage maintaining SPUD for the in-band processing device; where all of the SPUD for the information handling system is stored on the persistent storage; and where the method further comprises using the out-of-band processing device to install all of the saved SPUD for the information handling system from the persistent storage to the system storage and/or to locations in the persistent storage in one out-of-band operation.

17. The method of claim 13, the system storage maintaining SPUD for the in-band processing device, and at least one external input/output (I/O) interface coupled to the out-of-band processing device; where the in-band processing device is configured to access the system storage to support in-band system operations; and where the method further comprises using the out-of-band processing device to:
receive SPUD across the external I/O interface from an external user or external device;
save the received SPUD on the persistent storage; and
then install the saved SPUD from the persistent storage to the system storage.

18. The method of claim 13, further comprising using the at least one in-band processing device to execute a host operating system (OS) for the information handling system; and where the at least one out-of-band processing device is separate from the in-band processing device.

19. The method of claim 13, where the information handling system is a server that includes each of the in-band processing device, out-of-band processing device, system storage and persistent storage.

20. A method of managing System Profile Unique Data (SPUD) for one or more in information handling systems, comprising:
providing an information handling system, comprising:
at least one in-band processing device,
at least one out-of-band processing device,
system storage separate from the persistent storage;
persistent storage coupled to the out-of-band processing device and to the in-band processing device;
using the out-of-band processing device to manage SPUD stored on the persistent storage for the information handling system, the SPUD including machine-specific information that is unique to the information handling system;
and at least one of:
using the out-of-band processing device to receive SPUD from another separate information handling system and to store the received SPUD on the persistent storage, and then using the out-of-band processing device to install the stored received SPUD from the persistent storage to the system storage; or
using at least one of the in-band processing device or the out-of-band processing device to gather SPUD from the system storage and to save the gathered SPUD on the persistent storage, and then using the out-of-band processing device to re-install the saved SPUD from the persistent storage to the system storage;
where the system storage maintains SPUD for the in-band processing device; and where the method further comprises using the out-of-band processing device to identify and gather SPUD from the system storage in an out-of-band manner while the in-band processing device is not operating, then to save the gathered SPUD on the persistent storage while the in-band processing device is not operating, and to then re-install the saved SPUD from the persistent storage to the system storage while the in-band processing device is not operating.

21. A method of managing System Profile Unique Data (SPUD) for one or more in information handling systems, comprising:
providing an information handling system, comprising:
at least one in-band processing device,
at least one out-of-band processing device,
system storage separate from the persistent storage;
persistent storage coupled to the out-of-band processing device and to the in-band processing device;
using the out-of-band processing device to manage SPUD stored on the persistent storage for the information handling system, the SPUD including machine-specific information that is unique to the information handling system;
and at least one of:
using the out-of-band processing device to receive SPUD from another separate information handling system and to store the received SPUD on the persistent storage, and then using the out-of-band processing device to install the stored received SPUD from the persistent storage to the system storage; or
using at least one of the in-band processing device or the out-of-band processing device to gather SPUD from the system storage and to save the gathered SPUD on the persistent storage, and then using the out-of-band processing device to re-install the saved SPUD from the persistent storage to the system storage;
where the system storage maintains SPUD for the in-band processing device; and where the method further comprises using the in-band processing device to execute an in-band operating system (OS) agent thereon to gather SPUD from the system storage while the in-band processing device is operating, and to save the gathered SPUD on the persistent storage; and where the method further comprises using the out-of-band processing device to then re-install the saved SPUD from the persistent storage to the system storage while the in-band processing device is not operating.

22. A method of managing System Profile Unique Data (SPUD) for one or more in information handling systems, comprising:
providing an information handling system, comprising:
at least one in-band processing device,
at least one out-of-band processing device, and
persistent storage coupled to the out-of-band processing device and to the in-band processing device; and
using the out-of-band processing device to manage SPUD stored on the persistent storage for the information handling system, the SPUD including machine-specific information that is unique to the information handling system;
where the provided information handling system further comprises system storage separate from the persistent storage, the system storage maintaining SPUD for the in-band processing device; where the out-of-band processing device is coupled to communicate with a virtual machine layer;
where the method further comprises using the out-of band processing device to implement an out-of-band LM/CFG manager to manage SPUD stored on the persistent storage for the information handling system; and
where the method further comprises using the in-band processing device to:
execute one or more guest operating systems and the virtual machine layer, access the system storage to support the guest operating systems and virtual machine operations, implement an in-band license manager and configuration (LM/CFG) utility on each of the guest operating systems and virtual machine layer to create the SPUD information, and use the in-band LM/CFG utilities implemented on each of the guest operating systems and virtual machine layer to create SPUD information for the system and to interact with the out-of-band LM/CFG manager to retrieve, import, export, validate, and re-generate licenses from the SPUD by interacting with out-of-band LM/CFG manager.

23. A method of managing System Profile Unique Data (SPUD) for one or more information handling systems, comprising:

providing an information handling system, comprising:
at least one in-band processing device,
at least one out-of-band processing device,
system storage separate from the persistent storage;
persistent storage coupled to the out-of-band processing device and to the in-band processing device;

using the out-of-band processing device to manage SPUD stored on the persistent storage for the information handling system, the SPUD including machine-specific information that is unique to the information handling system;

and at least one of:
using the out-of-band processing device to receive SPUD from another separate information handling system and to store the received SPUD on the persistent storage, and then using the out-of-band processing device to install the stored received SPUD from the persistent storage to the system storage; or using at least one of the in-band processing device or the out-of-band processing device to gather SPUD from the system storage and to save the gathered SPUD on the persistent storage, and then using the out-of-band processing device to re-install the saved SPUD from the persistent storage to the system storage;

where the method further comprises using the out-of-band processing device to identify and gather workload image information from the system storage that is separate from the SPUD, to save the gathered workload image data on the persistent storage, and to deploy the gathered workload information to one or more target information handling systems across the external I/O interface.

24. A method of managing System Profile Unique Data (SPUD) for one or more in information handling systems, comprising:

providing an information handling system, comprising:
at least one in-band processing device,
at least one out-of-band processing device,
system storage separate from the persistent storage;
persistent storage coupled to the out-of-band processing device and to the in-band processing device;

using the out-of-band processing device to manage SPUD stored on the persistent storage for the information handling system, the SPUD including machine-specific information that is unique to the information handling system;

and at least one of:
using the out-of-band processing device to receive SPUD from another separate information handling system and to store the received SPUD on the persistent storage, and then using the out-of-band processing device to install the stored received SPUD from the persistent storage to the system storage; or using at least one of the in-band processing device or the out-of-band processing device to gather SPUD from the system storage and to save the gathered SPUD on the persistent storage, and then using the out-of-band processing device to re-install the saved SPUD from the persistent storage to the system storage;

where the method further comprises using the out-of-band processing device to identify and gather workload image information from the system storage that is separate from the SPUD, to save the gathered workload image data on the persistent storage, and to deploy the gathered workload information to a plurality of target information handling systems across the external I/O interface.

25. An information handling system, comprising:
at least one in-band processing device;
at least one out-of-band processing device; and
persistent storage coupled to the out-of-band processing device and to the in-band processing device;

where the out-of-band processing device is configured to manage System Profile Unique Data (SPUD) stored on the persistent storage for the information handling system, the SPUD including machine-specific information that is unique to the information handling system; and where the information handling system further comprises system storage separate from the persistent storage, the system storage maintaining SPUD for the in-band processing device;

where the in-band processing device is configured to access the system storage to support in-band system operations;

where the in-band processing device is configured to execute an in-band operating system (OS) agent thereon to gather SPUD from the system storage while the in-band processing device is operating, and to save the gathered SPUD on the persistent storage; and where the out-of-band processing device is configured to then re-install the saved SPUD from the persistent storage to the system storage while the in-band processing device is not operating.

26. A method of managing System Profile Unique Data (SPUD) for one or more in information handling systems, comprising:

providing an information handling system, comprising:
at least one in-band processing device,
at least one out-of-band processing device, and
persistent storage coupled to the out-of-band processing device and to the in-band processing device; and using the out-of-band processing device to manage SPUD stored on the persistent storage for the information handling system, the SPUD including machine-specific information that is unique to the information handling system;

where the provided information handling system further comprises system storage separate from the persistent storage, the system storage maintaining SPUD for the in-band processing device; and where the method further comprises using the in-band processing device to execute an in-band operating system (OS) agent thereon to gather SPUD from the system storage while the in-band processing device is operating, and to save the gathered SPUD on the persistent storage; and where the method further comprises using the out-of-band processing device to then re-install the saved SPUD from the persistent storage to the system storage while the in-band processing device is not operating.

* * * * *